United States Patent [19]

Lippisch

[11] 3,830,179

[45] Aug. 20, 1974

[54] GROUND EFFECT FLYING SURFACE

[76] Inventor: Alexander M. Lippisch, 3450 Cottage Grove Ave. S.E., Cedar Rapids, Iowa 52403

[22] Filed: June 20, 1972

[21] Appl. No.: 264,416

[52] U.S. Cl............ 114/67 R, 114/66.5 H, 180/117, 180/119, 180/126
[51] Int. Cl............................................. B63b 1/38
[58] Field of Search ........ 114/66.5 H, 66.5 P, 67 R, 114/67 A; 180/116, 117, 119, 126; 244/12 R, 23 R, 35 R

[56] References Cited
UNITED STATES PATENTS

| | | | |
|---|---|---|---|
| 1,968,497 | 7/1934 | Magalis | 244/35 R |
| 2,855,885 | 10/1958 | Thomas | 180/116 |
| 2,989,269 | 6/1961 | Le Bez | 114/66.5 H |
| 3,390,655 | 7/1968 | Quady et al. | 114/66.5 H |
| 3,702,598 | 11/1972 | Szptyman | 114/67 A |

Primary Examiner—Lloyd L. King
Assistant Examiner—Randolph A. Reese
Attorney, Agent, or Firm—Warren H. Kintzinger

[57] ABSTRACT

A combination air and water surface transport vehicle utilizing aerodynamic ground effect for support in flying in close proximity to water surface or over flat land with low drag and high efficiency.

14 Claims, 5 Drawing Figures

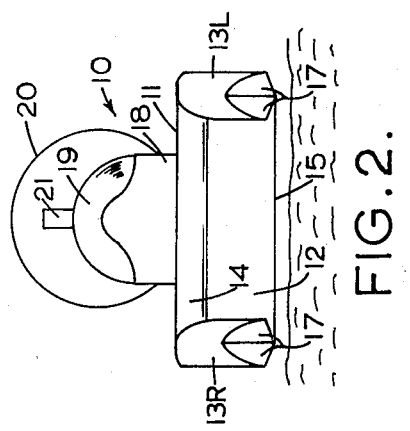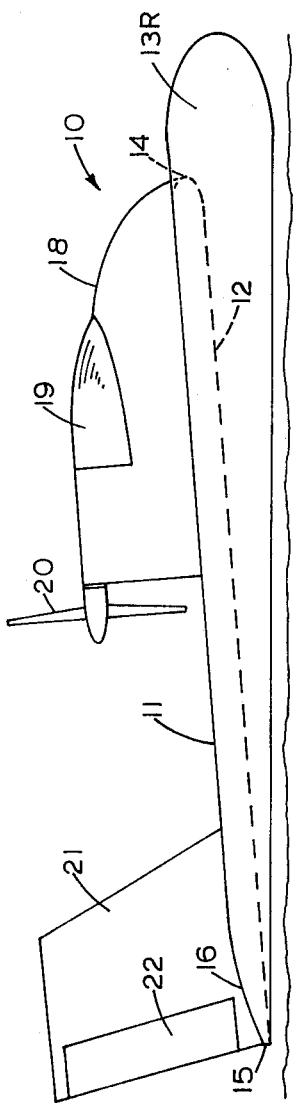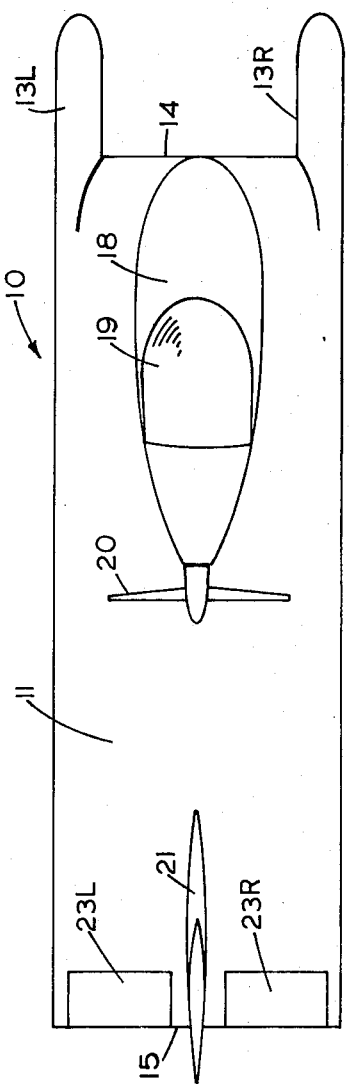

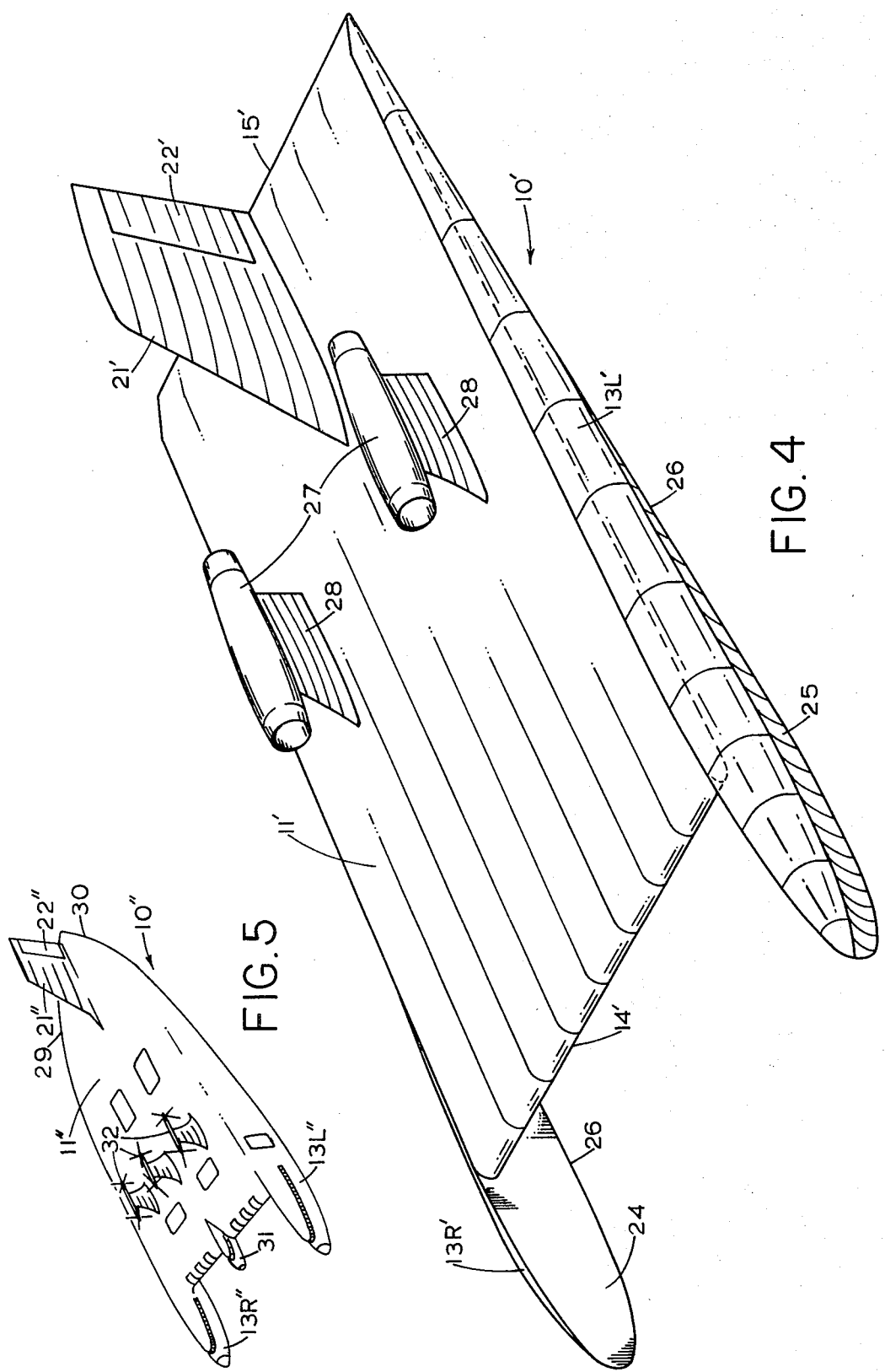

GROUND EFFECT FLYING SURFACE

This invention relates in general to a ground effects operational vehicle and, in particular, to an aerodynamic vehicle employing a low aspect ratio flat plate, in place of a conventional wing, equipped with side end plates, generally in the form of floats, that is quite stable both in and out of ground effects.

Conventional aircraft in their various forms for particular uses are generally quite expensive. Boats, on the other hand, while having their advantages, are also plagued with limitations such as, for example, severe speed limitations imposed by water drag with higher boat speeds. What then, you might ask, would be a safe effective vehicle filling a gap between conventional aircraft on one hand and boats on the other.

It is, therefore, a principal object of this invention to provide a relatively simple clean structurally sound aerodynamic ground effects operational flat plate vehicle.

Another object is to provide such a vehicle operational as a boat at slow speeds and as a ground effects ram air cushion supported vehicle at medium and higher speeds.

A further object with such a vehicle is a full flight capability above ground effects with complete stability both in and out of ground effects.

Still another object with some embodiments is the attainment of such aerodynamic capabilities without changing aerodynamic surfaces such as flaps.

A further object is to utilize the structural advantages inherrent in a low aspect ratio plate construction in the attainment of high pay load capabilities in generally a long range highly efficient vehicle.

Features of the invention useful in accomplishing the above objects include, in a ground effects operational low aspect ratio flat plate aerodynamic vehicle, an aerodynamic generally rectangular flat plate having an aspect ratio below approximately 1:1. Typical aspect ratios as low as 1:2 and 1:3 are used with the trend to lower aspect ratios, in the range of the sample ratios presented, resulting in greater flight stability. End plates enclose the two opposite sides at the transverse edges relative to vehicle forward travel and generally serve as floats for the vehicle although, the end plates could be structure containing an undercarriage. One or more engines are mounted on top of the "wing" surface. The units that have been built have a fin at the rear and engine power controlled the flight condition, low power flying in ground effect and greater power climbing out of ground effect. Yet there is great ground effects trimming stability since the free flight power requirements are considerably greater than power requirements for sustained cruising in ground effects. Stabilization is attained through use of a flat plate section that is inherently stable and further, through the use of a very small aspect ratio plate section having a very large induced drag in free flight that is considerably reduced in the ground effects zone in close proximity to the water surface or ground. The increase in drag as the vehicle is lifting to lessened ground effects and above coupled with propeller thrust impart a pitch down moment greatly enhancing the ground effects operational zone stability of the craft.

Specific embodiments representing what are presently regarded as the best modes of carrying out the invention are illustrated in the accompanying drawings.

In the drawings:

FIG. 1 represents a side elevation view of a relatively small sports low aspect ratio plate ground effects aerodynamic vehicle;

FIG. 2, a front view of the ground effects operational sports vehicle of FIG. 1;

FIG. 3, a top plan view of the ground effects sports vehicle of FIGS. 1 and 2;

FIG. 4, a perspective view of a much larger low aspect ratio ground effects operational vehicle; and, FIG. 5, a perspective view of a giant long distance high pay load low aspect ratio aerodynamic plate ground effects operational vehicle.

Referring to the drawings:

The low aspect ratio flat plate aerodynamic sports vehicle 10 of FIGS. 1, 2, and 3 is shown to be relatively clean simple structure having a short span transversely across flat plate 11 with an aspect ratio of approximately 1:3. A ram air chamber is provided under the bottom 12 of the flat plate 11 that is enclosed from the sides by side plates (or wing end plates) in the form of floats 13L and 13R having a vertical front to rear generally triangular shape in accord with the vehicle usual angle of attack attitude for take off. Further, the bottoms of the floats 13L and 13R, through the longitudinal length of flat plate 11 from front leading edge 14 to trailing edge 15, are substantially in a common plane with the bottom of trailing edge 15 of flat plate 11. This results in the vehicle 10 being an effective ground effects operational craft riding on a ram air generated air cushion built up under the flat plate 11 with forward travel. The leading edge 14 of the flat plate 11 is rounded and the rear of the flat plate 11 has a downward tapered area 16 that tapers down from full plate 11 thickness to a thin rear trailing edge for streamlining and reduced air flow resistance purposes. The floats 13L and 13R project forwardly from the leading edge 14 of flat plate 11 and are provided with boatlike dead rise surfaces 17, particularly under the forward portions thereof.

The sports vehicle includes a passenger and engine containing compartment 18 equipped with a canopy 19 and a pusher propeller 20 at the rear thereof mounted to project above the forward center portion of flat plate 11. The craft is also equipped with a vertical fin 21 mounted to extend vertically from the center rear of the flat plate 11 and is equipped with a rudder surface 22 for turning control. While the craft, as shown in FIGS. 1 and 2, does not employ elevator surfaces such as the elevator surfaces 23L and 23R, shown in FIG. 3, the craft may be so equipped for greater operator controlled movement out of the ground effects zone to flight and above and return to the ground effects zone as desired. Further, the control surfaces 23L and 23R could be combination elevator and aileron surfaces for additional operator control in a sports craft above and beyond the inherent excellent ground effects stability characteristics of the craft without such surfaces.

In cross section the aerodynamic low ratio flat plates run in the range of approximately 3–5 percent the length in thickness with a rounded nose edge and tapered down or pointed rear. Wind tunnel test results have shown that below aspect ratio 1 flat plates are better than cambered wings with the usual wing sections. Flat plate vehicles with a rectangular wing where the span is only a fraction of the length as, for example, one half to one quarter of the chord length have excellent longitudinal stability, low drag and very high efficiency in ground effects operation flying in close proximity over the ground or water surface.

The low aspect ratio ground effects operational vehicle 10' of FIG. 4 is a much larger vehicle with a flat plate 11' having, for example, a width of 150 feet, a length of 300 to 400 feet or more, and a thickness of approximately 12 feet. Obviously, such a plate 11' lends itself to good efficient structural design strong and light with excellent payload capabilities. In any event wing end (or plate side) floats 13L' and 13R' are mounted to the opposite side ends of the flat plate 11'. Floats 13L' and 13R' project forwardly from the leading edge 14' of the plate 11', are formed with flat vertical inboard surfaces 24 and bottom boatlike outboard facing dead rise surfaces 25 and have bottom edges 26 running substantially common to the plane of the bottom of the plate trailing edge 15'. In addition to vertical fin 21' and rudder 22' ducted fan (or jet) engines 27 are mounted on vertical pedestal mounts 28 well above the top of flat plate 11'. Crew and passenger and/or cargo compartments could be located many places in the vehicle 10'(detail not shown).

A giant long distance high pay load ground effects operational vehicle 10" is shown in FIG. 5. This vehicle also employs a low aspect ratio aerodynamic plate 11" with, however, the rear of the vehicle tapered to a point right behind fin 21" and rudder 22". Here again the bottom of the vehicle under float sections 13L" and 13R" from the area of the plate leading edge through the trailing edges 29 and 30 are in substantially a common plane. Passenger and/or cargo compartments are provided in floats 13L" and 13R" and in the plate 11". A crew compartment is contained in a nose projection 31 extended forwardly from the center of flat plate 11". A plurality of engine and propeller drive units 32 are mounted on the top of plate 11" to provide generally the same operational characteristics as have been described with respect to other embodiments presented hereinbefore.

Whereas this invention is illustrated and described with respect to a plurality of embodiments thereof, it should be realized that various changes may be made without departing from the essential contributions to the art made by the teachings hereof.

I claim:

1. In a ground effects operational vehicle utilizing a ram air cushion built up under the craft with forward vehicle movement; a low width to length aspect ratio aerodynamic flat plate having substantially parallel upper and lower planar surfaces throughout most of the length of the flat plate; opposite plate side edge ram air chamber enclosure means extended downward from connection with the respective side edges of the flat plate to a lower edge generally co-planar with a trailing edge of the flat plate longitudinally co-extensive generally through the longitudinal extent of the side edges of the flat plate, and with the lower edges at a downward, forward-facing angle from the flat plate; fin means mounted on the top of said flat plate; vehicle propulsion means; and structural propulsion unit mount means for mounting said propulsion means above said flat plate.

2. The ground effects operational vehicle of claim 1, wherein the low width to length aspect ratio of said aerodynamic flat plate is an aspect ratio below approximately 1:1.

3. The ground effects operational vehicle of Claim 2, wherein said opposite plate edge ram air chamber enclosure means are opposite side floats; and said fin means is mounted toward the rear of the top of said flat plate.

4. The ground effects operational vehicle of claim 3, wherein said opposite side floats extend longitudinally forward from the leading edge of the flat plate; and including boatlike dead rise surface means on the bottom of said floats.

5. The ground effects operational vehicle of claim 4, wherein said opposite side floats have flat inboard surfaces next to the opposite side edges of said flat plate; and outboard facing dead rise bottom surfaces.

6. The ground effects operational vehicle of claim 4, wherein a crew compartment is mounted on the top of said flat plate; and said vehicle propulsion means includes a pusher propeller located to the rear of said crew compartment and driven by prime mover means enclosed within structure above the top of said flat plate.

7. The ground effects operational vehicle of claim 4, wherein said fin means mounts rudder means; the flat plate leading edge is rounded; and the flat plate has a rearward located tapered down area from full flat plate thickness to a thin rear trailing edge for streamlining and reducing air flow resistance.

8. The ground effects operational vehicle of claim 7, wherein movable elevator control surface means are mounted in said tapered down area at the rear of flat plate.

9. The ground effects operational vehicle of claim 4, wherein the width to length aspect ratio of said aerodynamic flat plate is a low aspect ratio falling in the range of approximately 1:2 to 1:4.

10. The ground effects operational vehicle of claim 4, wherein said vehicle propulsion means includes a plurality of drive units mounted by pedestal structures high above the top of said flat plate.

11. The ground effects operational vehicle of claim 10, wherein said plurality of drive units are ducted fan or jet engine units.

12. The ground effects operational vehicle of claim 10 wherein said flat plate is tapered from the sides to a point at the rear in top plan view.

13. The ground effects operational vehicle of claim 3, wherein said opposite side floats are generally triangular in side elevation beneath the plane of the lower planar surface of said flat plate with the apexes of the triangular shape of both opposite side floats at the rear and substantially in alignment with the trailing edge of the lower planar surface of said flat plate.

14. The ground effects operational vehicle of claim 1, wherein said low width to length aspect ratio aerodynamic flat plate has a thickness between said upper and lower planar surfaces running in the range of approximately 3 to 5 percent the flat plate front to rear length.

* * * * *